United States Patent
Hassan

(10) Patent No.: US 10,419,215 B2
(45) Date of Patent: Sep. 17, 2019

(54) USE OF ERROR INFORMATION TO GENERATE ENCRYPTION KEYS

(71) Applicant: Microsoft Technology Licensing, LLC, Redmond, WA (US)

(72) Inventor: Amer Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 15/344,017

(22) Filed: Nov. 4, 2016

(65) Prior Publication Data

US 2018/0131510 A1 May 10, 2018

(51) Int. Cl.
*H04L 9/00* (2006.01)
*H04L 9/08* (2006.01)

(52) U.S. Cl.
CPC .......... *H04L 9/0861* (2013.01); *H04L 9/0838* (2013.01); *H04L 2209/34* (2013.01)

(58) Field of Classification Search
CPC .. H04L 2209/24; H04L 9/0838; H04L 9/0861
USPC ........................................................ 380/44
See application file for complete search history.

(56) References Cited

U.S. PATENT DOCUMENTS

| | | |
|---|---|---|
| 3,162,837 A | 12/1964 | Meggitt |
| 3,831,144 A | 8/1974 | En |
| 4,133,973 A | 1/1979 | Branscome et al. |
| 4,218,582 A | 8/1980 | Hellman et al. |
| 4,271,520 A | 6/1981 | Coombes et al. |
| 5,724,383 A | 3/1998 | Gold et al. |
| 5,995,533 A | 11/1999 | Hassan et al. |
| 7,171,552 B1 * | 1/2007 | Bell .......................... H04L 9/12 713/150 |
| 7,949,032 B1 * | 5/2011 | Frost ..................... H04L 9/0838 375/140 |

(Continued)

FOREIGN PATENT DOCUMENTS

CA 1254277 A 5/1989

OTHER PUBLICATIONS

Zhang, et al., "Key Generation from Wireless Channels: A Review", In Journal of IEEE Access, vol. 4, Jan. 27, 2016, pp. 614-626.

(Continued)

*Primary Examiner* — Samson B Lemma
(74) *Attorney, Agent, or Firm* — NovoTechIP International PLLC

(57) ABSTRACT

The embodiments provide cryptography keys for communicating devices that are based on information known only to the devices. Each device determines the information without communicating key information related to the key with the other. In an implementation, a first device sends a first signal to a second device, the second device loops back the first signal to the first device as a second signal, and the first device generates a first key based on error information from the second signal. Also, the second device sends a third signal to the first device, the first device loops back the third signal to the first device as a fourth signal, and the second device generates a second key based on error information from the fourth signal. The first device and second device then encrypt and decrypt communications between the first device and second device using the first key and second key.

20 Claims, 4 Drawing Sheets

(56) References Cited

U.S. PATENT DOCUMENTS

| | | | |
|---|---|---|---|
| 8,238,551 B2 | 8/2012 | Reznik et al. | |
| 2005/0244000 A1* | 11/2005 | Coleman | H04L 9/0662 380/44 |
| 2007/0036353 A1 | 2/2007 | Reznik et al. | |
| 2007/0058808 A1* | 3/2007 | Rudolf | H04L 9/0841 380/44 |
| 2010/0135498 A1* | 6/2010 | Long | H04L 9/0866 380/278 |
| 2012/0159147 A1* | 6/2012 | Ando | H04L 9/0875 713/150 |
| 2012/0328098 A1 | 12/2012 | Chandrashekar et al. | |
| 2015/0048977 A1* | 2/2015 | Khandani | H01Q 3/46 342/385 |

OTHER PUBLICATIONS

Marino, et al., "Secret key extraction from a UWB channel: Analysis in a real environment", In Proceedings of IEEE International Conference on Ultra-WideBand, Sep. 1, 2014, pp. 80-85.

Badawya, et al., "Unleashing the secure potential of the wireless physical layer: Secret key generation methods", In Journal of Physical Communication, vol. 19, Jun. 2016, pp. 1-10.

Zhang, et al., "Efficient Key Generation by Exploiting Randomness from Channel Responses of Individual OFDM Subcarriers", In Journal of IEEE Transactions on Communications, vol. 64, Issue 6, Jun. 2016, pp. 2578-2588.

* cited by examiner

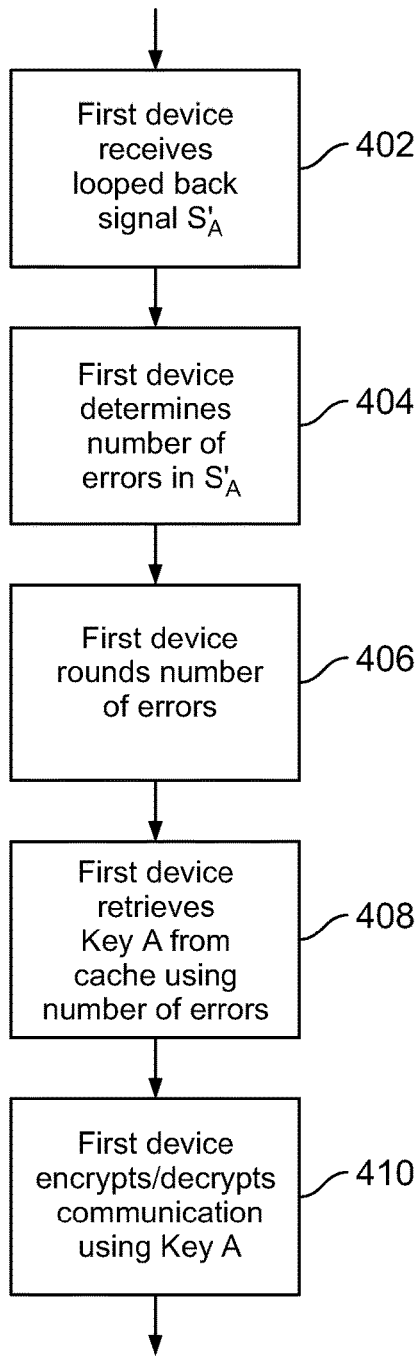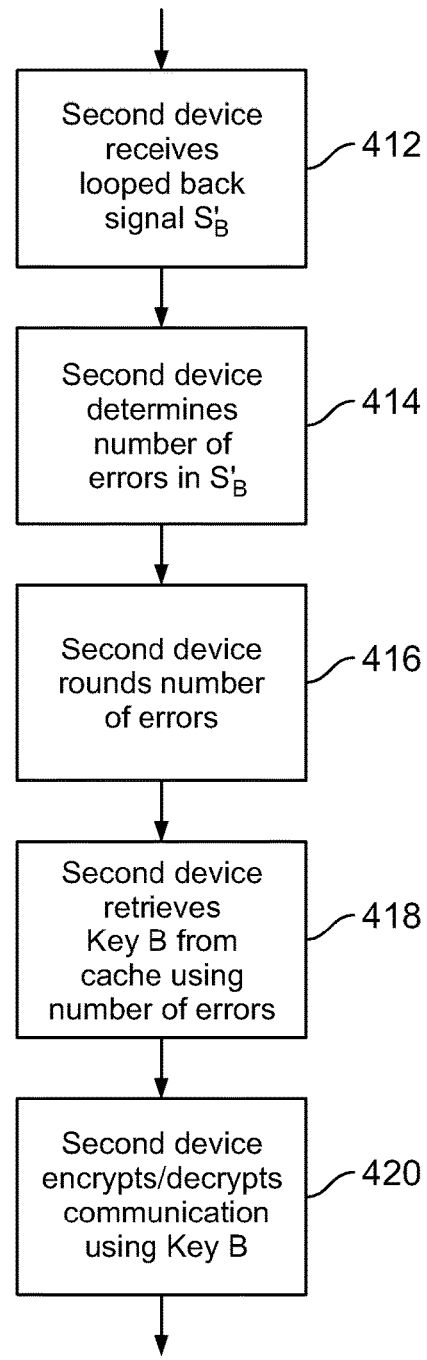
FIG. 4A
FIG. 4B

USE OF ERROR INFORMATION TO GENERATE ENCRYPTION KEYS

BACKGROUND

Many cryptography methods require exchange of key information between two devices or require keys, or other information related to the encryption, to be stored in each of the two devices in order to encrypt and decrypt communications between the devices. A security concern with these methods is that the exchanged key information may be intercepted during the exchange, or the keys or other information related to the encryption that is stored on the devices may be compromised by theft or otherwise. A person in possession of the key information or other information related to the encryption may then intercept and decrypt the communications between the two devices. Key distribution is considered to be one of the most important elements in secure communications. Current methods require complex and expensive network security deployment. In most cases distribution of certificates to the devices must be performed.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The embodiments of the disclosure include systems, devices, and methods that provide cryptography key generation for use in communication devices. In example implementations, key generation in each of two communicating devices is based on information that is determined at, and known only to, the two devices. The information on which the key generation is based may be determined in each of the devices at the time of communications. Each of the devices may determine the information without communicating any information related to the keys with each other over a channel or having knowledge of the information beforehand.

The embodiments include an implementation of a first device that communicates with a second device. The first device may be configured to send a first setup signal to the second device, receive a second setup signal from the second device, where the second setup signal may be a looped back version of the first setup signal, perform error correction processing on the second setup signal, determine a number of errors in the second setup signal, generate a key based on the number of errors in the second setup signal, and utilize the key to exchange one or more secure data signals with the second device. In order to allow the second device to create an identical key, the first device may also be configured to receive a third setup signal from the second device and send a fourth setup signal to the second device, where the fourth setup signal may be a looped back version of the third setup signal. The second device may then create a key in an identical manner by generating a key based on the number of errors in the fourth signal. Use of identical setup signals for the first and third setup signals allows the first and second devices to create keys that are identical. The keys may then be used to encrypt/decrypt data signals exchanged between the first and the second devices.

In other example implementations, the first device may perform error correction processing on the second setup signal that is received from the second device as the looped back first signal, determine a number of errors in the second setup signal, and use the number of errors to generate a key. For example, the first device may round the number of errors to a selected granularity. The rounding of the number of errors may be done by rounding up or down. The rounded number of errors may be used as an index to access a cache comprising a plurality of keys and retrieve a key corresponding to the index. The retrieved key may then be used to encrypt/decrypt data signals exchanged between the first and the second devices. The second device may create a key using the identical method to generate a key based on the number of errors in the fourth signal that is received from the first device as the looped back third signal. In this implementation the first and second devices may each include identical caches, including the same keys indexed identically. In another example implementation, the rounded number of error may be used to initialize a shift register that generates a key for encryption/decryption. In this implementation the first and second devices may each include identical shift registers for use in the key generation.

The example implementations include a network that includes a first device and a second device each configured to implement cryptography according to the embodiments. The first device may comprise a mobile device and the second device may comprise a device or apparatus in the network infrastructure. In an alternative, the first and second devices may each be a mobile device configured to communicate with other mobile devices.

BRIEF DESCRIPTION OF THE DRAWINGS

FIGS. 4A and 4B are flow diagrams illustrating example key creation operations in communicating devices;

DETAILED DESCRIPTION

Figure 1A:
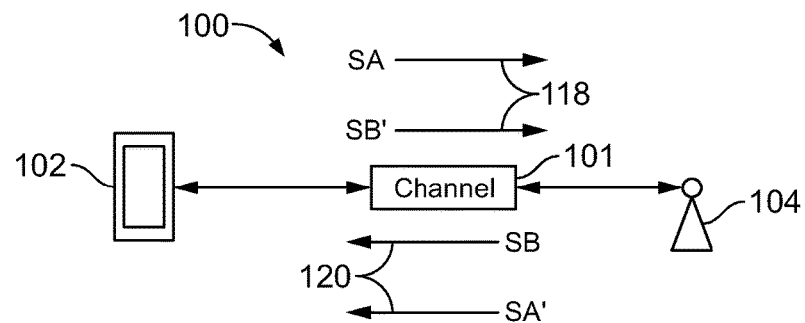
FIG. 1A is a simplified diagram illustrating an example network into which an embodiment of the disclosure may be implemented.

The system, devices, and methods will now be described by use of example embodiments. The example embodiments are presented in this disclosure for illustrative purposes, and not intended to be restrictive or limiting on the scope of the disclosure or the claims presented herein.

The disclosed embodiments provide a technical advantage in that two devices may configure encryption/decryption for secure communications on a channel between the two devices without exchanging keys or key related information over any channel, or by any other exchange methods, as a part of configuring or initiating the encryption/decryption keys. An advantage is also provided in that keys or knowledge of the keys used need not be provided to, or stored on, any of the devices prior to configuring the secure communications. As compared to cryptography methods that require exchange of keys or key related information by communicating devices when setting up secure communications, the embodiments prevent the possibility of exchanged key information being intercepted when exchanged between devices. As compared to cryptography methods in which devices rely on prior knowledge of keys, the embodiments prevent the possibility that keys may be compromised by theft or other misappropriation from a device or network.

The embodiments utilize the fact that a first signal, sent from a first device to a second device, that traverses both directions of a bidirectional communication link between the first and second device by being looped back to return the first device, and a second signal, sent from the second device to the first device, that traverses both directions of the bidirectional communication link between the first and the second device by being looped back to return the second device, will be similarly affected by power loss/gain when traversing the bidirectional link. Effectively, each of the first and second signals will encounter the same power loss/gain effects on traversing the loop. The number of bit errors that are detected at the first and second device in the looped back first and looped back second signal, respectively, will be nearly identical or identical if appropriate signal parameters are used. Any discrepancies between the number of errors detected in each for the first and second devices may be removed by rounding the number of errors to the same selected granularity in each device.

Because the number of bit errors in each of the first and the second looped back signals are based on the power characteristics of the bidirectional link between the two devices at the time of key generation, the number of errors may be only known to each of the two devices. For example, the antenna gains of both of the first and second devices affect each of the first and the second signal as it is sent and looped back. The thermal noise introduced by both of the first and the second device also affects each of the first and the second signal as it is sent and looped back. Only the first and second devices may mutually exchange signals that are affected by these same power characteristics. A third device that attempts to intercept communications will not be able to decode the communications. The third device will not be able to intercept the keys or key information because the keys or key information are not exchanged on any channel. Neither will the third device be able to determine the keys from the power characteristics of the bidirectional link between the first and the second devices. By their nature, the power characteristics of the bidirectional link can be known only to each of the first and the second device that send/receive signals on that bidirectional link. The embodiments also provide an advantage in that the keys generated in each of two devices may be updated as appropriate to provide additional security. Because the keys are generated based on the power characteristics of the channel between the two devices at the time of key generation, each time new keys are generated under different channel conditions the keys will be based on different power characteristics/number of errors and will be different from previously generated keys.

The embodiments have application to provide secure communications, for example, in time division duplex networks or systems such as those operating according to Wi-Fi implementations based on the IEEE 802.11 Standards. In Wi-Fi variants (using 802.11a, b, g, n and c), a device may communicate with an access point of a network on a wireless bi-directional time division half-duplex frequency channel. The device and access point use the same channel frequency (i.e., same channel) for both directions of the bidirectional link. A first setup signal may be sent from the device to the access point and looped back by the access point to the device. The second setup signal may be sent from the access point to the device and looped back by the device to the access point. Implementations of the embodiments in a Wi-Fi network may utilize the power characteristics of the bi-directional frequency channel between the device and access point to generate keys for encrypting/decrypting communications.

The embodiments also have application to networks or systems using communication channels configured according to other standards. For example, setup signals sent on the different frequency channels of each of an uplink and downlink between two devices may be used to create identical keys in both devices. For example, the first setup signal may be sent from a mobile device to a base station on the uplink frequency and looped back by the base station to the mobile device on the downlink frequency. The second setup signal may be sent from the base station to the mobile device on the downlink frequency and looped back by the mobile device to the base station on the uplink frequency.

Referring now to FIG. 1A, therein is a simplified diagram illustrating an example network 100 in which an embodiment of the disclosure may be implemented. FIG. 1A shows device 102 communicating with device 104 over a channel 101. Device 102 may be a mobile device operating in the coverage area of network 100 and device 104 may be an access point or base station of network 100. Channel 101 may comprise a bidirectional link including one or more frequency channels for communications between device 102 and device 104. For example, channel 101 may comprise a time division half-duplex frequency channel that may be used by both device 102 and device 104 for exchanging communications with each other. In this example network 100, device 102 and device 104 may be configured to operate according to the IEEE 802.11 Wi-Fi specifications. In another example, channel 101 may comprise uplink and downlink frequency channels, where the uplink channel carries signals sent from device 102 to device 104 and the downlink channel carries signals sent from device 104 to device 102. In this example of network 100, device 102 and device 104 may operate according to a cellular or wireless specification/standard such as the wide band code division multiple access (WCDMA) or long term evolution (LTE) standards specifications published by the $3^{rd}$ Generation Partnership Project (3GPP). In other examples, the network 100 may also be implemented according to any other wireless specifications, for example 4G or 5G standard specifications, or network 100 may be a proprietary system.

Figure 1B:
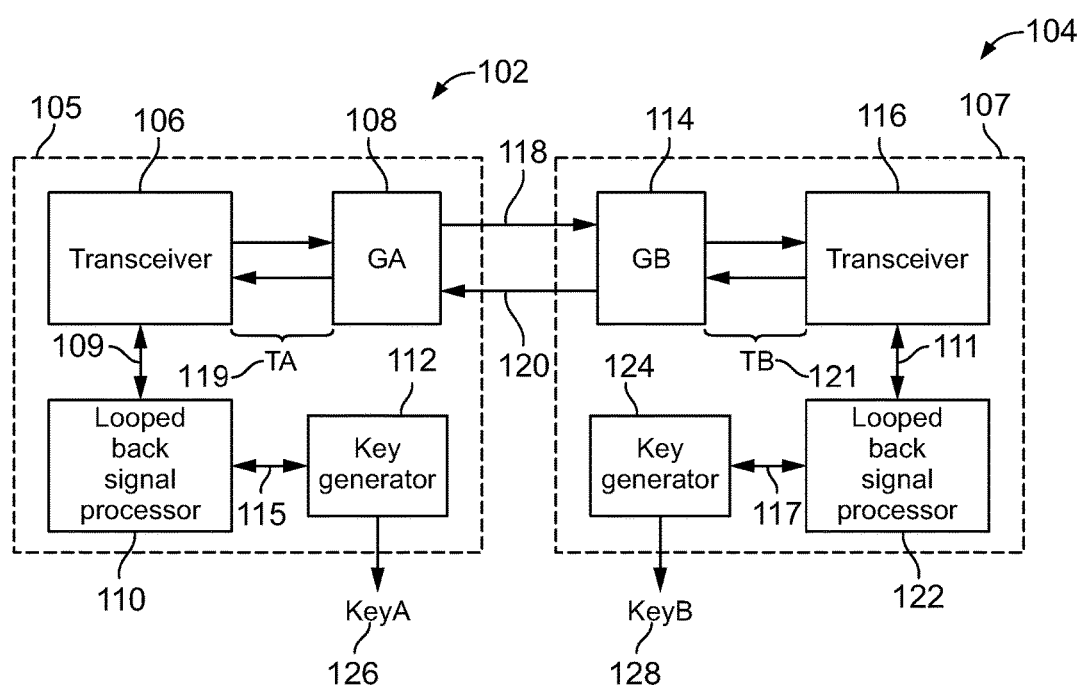
FIG. 1B is a simplified block diagram illustrating portions of example devices.

FIG. 1B is a simplified block diagram illustrating example portions of devices 102 and 104 in an implementation of FIG. 1A. Device 102 includes a portion 105 that includes transceiver 106, looped back signal processor 110, and key generator 112. Portion 105 also may include an antenna 108 having a gain GA. Portion 105 is also shown as including a thermal power loss TA 119 that affects signals sent and received by transceiver 106. Device 104 includes a portion 107 that includes transceiver 116, looped back signal processor 122, and key generator 124. The components of portion 107 may also include an antenna 114 having a gain GB. Portion 107 is also shown as including a thermal power loss TB 121 that affects signals sent and received by transceiver 116. Portion 105 communicates with other functions on device 102 and portion 107 communicates with other functions on device 104 to perform operations of cryptography according to the embodiments of the disclosure. Device 102 and 104 may each include one or more processors, circuitry, and/or code comprising programs for implementing, respectively, the functions shown in portions 105 and 107. The functions shown in portions 105 and 107 of devices 102 and 104 may be separately configured on each device, or may be configured as combined, in whole or in part, with processors, circuitry, and/or code or programs that are also utilized for other functions on the devices. For example, transceivers 106 and 116 may include, respectively, the transceivers or portions of the transceivers in devices 102 and 104 that are also used for data communication.

Figure 2:
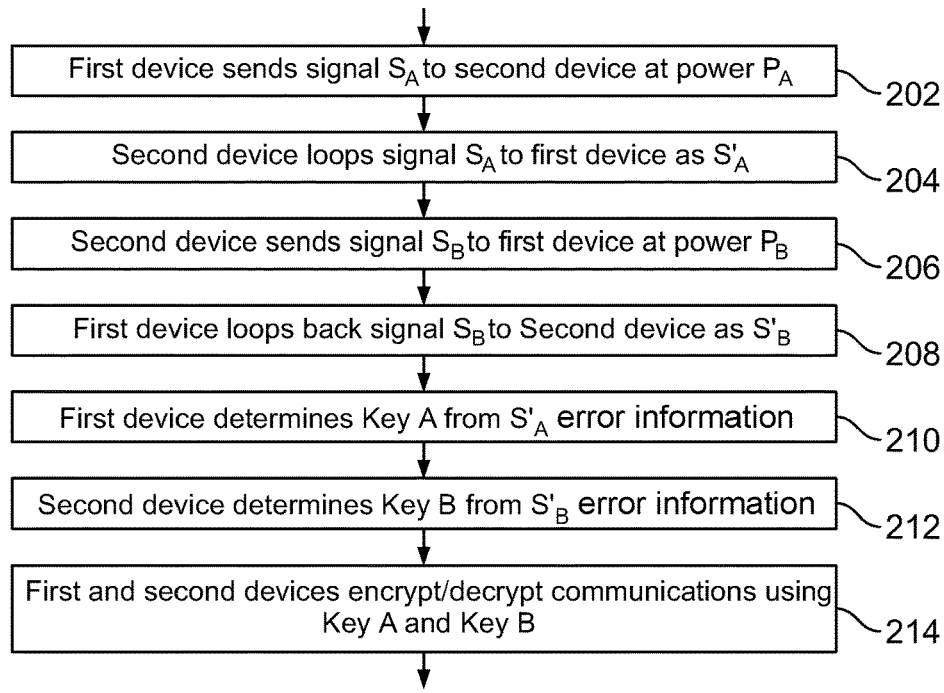
FIG. 2 is a flow diagram illustrating key generation operations performed in example communicating devices.

FIG. 2 is a flow diagram illustrating key generation operations performed in example communicating devices, such as devices 102 and 104 of FIGS. 1A and 1B. The operations performed in FIG. 2 may be explained using device 102 as the first device and device 104 as the second device of FIG. 2.

The process begins at 202 where device 102 sends signal $S_A$ to device 104 on channel 118 using transceiver 106 at power level $P_A$. The value of power level $P_A$ may be chosen based on network and device parameters. The signal $S_A$ may be a setup signal that comprises a data signal including a string of bits. For example, $S_A$ may comprise a string of consecutive 0 bits. In an example implementation, $S_A$ may comprise on the order of 1 gigabit (GB) of data and be transmitted at a duration that is long enough to send the complete 1 GB of data. For a system transmitting at 100+ Mbps, such as a Wi-Fi 802.11n system, SA may be on the order of 10 seconds. In some embodiments, a user of device 102 may be able to initiate the generation of keys for communicating with device 104 by selecting a key generation option from a menu. For example, in the process of FIG. 2, after initial communications with device 104, a user of device 102 may be able to select a "generate secret key" option from a menu and initiate a handshake process with device 104 to confirm that the key generation process is to begin at operation 202.

At 204, device 104 receives signal $S_A$ using transceiver 116 and loops back signal $S_A$ to device 102 as signal $S'_A$ on channel 120 at power lever $P_B$. The value of power level $P_B$ may be chosen without knowledge of $P_A$ as long as $P_B$ is within network and device parameters. $P_B$ may or may not be equal to $P_A$. Signal $S'_A$ may be identical to the signal $S_A$ as it was received at transceiver 116, and signal $S'_A$ may have the same duration and the same number of bits as in signal $S_A$. In an implementation, transceiver 116 of device 104 may function as a repeater that repeats $S_A$ as the looped back signal $S'_A$ to device 102 without decoding $S_A$.

At 206, device 104 sends signal $S_B$ to device 102 on channel 120 in the opposite direction using transceiver 116 at power level $P_B$. Signal $S_B$ may be a setup signal identical to signal $S_A$. For example, if the signal $S_A$ comprises a string of 0 bits, $S_B$ may also be a data signal comprising a string of the same number of 0 bits and having the same duration. The value of power level PB at which $S_B$ is sent may be the same as power level $P_B$ at which $S'_A$ is sent. At 208, device 102 receives signal $S_B$ 110 using transceiver 106 and loops back signal $S_B$ to device 104 as signal $S'_B$ on channel 118 at power level $P_A$. Signal $S'_B$ may be identical to the signal $S_B$ as it was received at transceiver 106. In an implementation, transceiver 106 of device 102 may function as a repeater that repeats $S_B$ as the looped back signal $S'_B$ to device 104 without decoding $S_B$.

At 210, device 102 determines key A from $S'_A$. Device 102 receives $S'_A$ at transceiver 166, provides $S'_A$ to looped back signal processor 110 as signal 109, and looped back signal processor 110 processes signal $S'_A$. Looped back signal processor 110 may process signal $S'_A$ to generate error information from signal $S'_A$ to determine key A 126. For example, looped back signal processor 110 may perform error correction coding on signal $S'_A$ and generate a number of bit errors $E_A$ that were discovered in the error correction coding to generate the error information. Looped back signal processor 110 may provide the error information to key generator 112 as signal 115 and key generator 112 may generate key A 126 from the error information. In other implementations, the error information may comprise any type of information determined from $S'_A$ that is a quantifiable measure/indication how the signals $S_A$ and $S'_A$ were affected by the power characteristics in traversing the path from device 102 to device 104, and back again from device 104 to device 102. For example, the error information may comprise a measure of randomness or burstiness of bit errors in $S'_A$, or information on averages/clustering of locations of bit errors.

At 212, device 104 determines key A from $S'_B$. Device 104 receives signal $S'_B$ at transceiver 106, provides $S'_B$ to looped back signal processor 122 as signal 111, and looped back signal processor 122 processes signal $S'_B$ to generate error information. Looped back signal processor 122 may perform error correction coding on signal $S'_B$ and generate a number of errors $E_B$ that were discovered in the error correction coding to generate the error information. The error correction coding performed by looped back signal processor 122 may be the same error correction coding performed by looped back signal processor 110 of device 102. In other implementations, the error information determined by looped back signal processor 122 may comprise any other type of error information that is determined by looped back signal processor 110 of device 102. Looped back signal processor 122 may provide the error information to key generator 124 as signal 117 and key generator 124 may generate key B 128 from the error information. The key B 128 generated at operation 216 may be generated using the same operation as used by key generator 112 at 214.

Then, at 218, device 102 and device 104 utilize the keys generated by key generator 112 and key generator 114, respectively, to encrypt/decrypt communications sent between the two devices.

Figure 3:
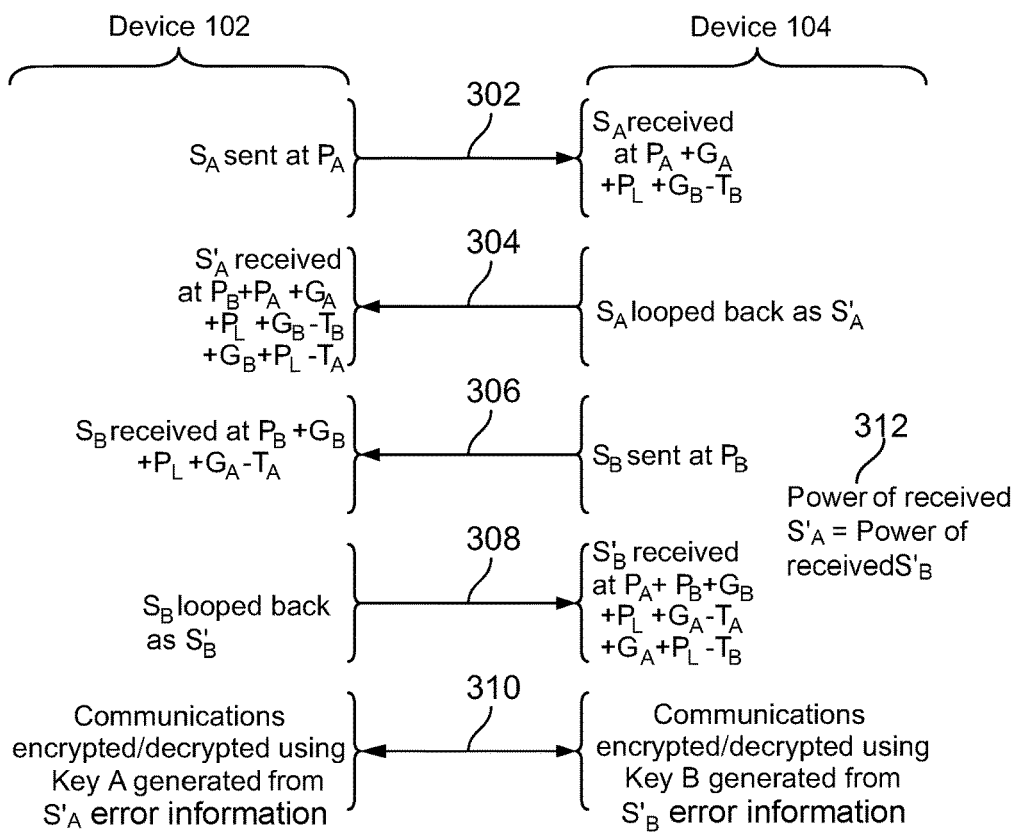
FIG. 3 is a signal flow diagrams illustrating signals exchanged between devices to generate keys.

FIG. 3 is a signal flow diagram illustrating signals exchanged between devices to generate keys. FIG. 3 shoes how the implementation of FIG. 2 allows a key to be created in each of devices 102 and 104 where the keys may be identical, or nearly identical. FIG. 3 shows the path of signal $S_A$ from device 102 to device 104 and back again as signal $S'_A$ from device 104 to device 102. FIG. 3 also shows the path of signal $S_B$ from device 104 to device 102 and back again as signal $S'_B$ from device 102 to device 104. The units used in FIG. 3 may be in dBm.

At 302, transceiver 106 of device 102 sends $S_A$ to device 104 at transmission power $P_A$. The received power level of $S_A$ ($RPS_A$) at device 104 is calculated by including the gain $G_A$ 108, of the antenna of device 102, the transmission loss $P_L$ on the channel 101, the gain $G_B$ 114 of the antenna of device 104, and the thermal power loss TB of device 104.

$RPS_A$ at device 104 depends on $P_A+G_A+P_L+G_B-T_B$

At 304, transceiver 116 of device 104 loops back $S_A$ to device 102 as signal $S'_A$ at transmission power level B. The received power level of $S'_A$ ($RPS'_A$) at transceiver 106 of device 102 is calculated by including the gain $G_B$ 114 of the antenna of device 104, the transmission loss $P_L$ on the channel 101 from device 104 to device 102, and the thermal power loss $T_A$ of device 102 to the original signal $S_A$ as was received at transceiver 116 and that was looped back.

$RPS'_A$ at device 102 depends on $P_B+P_A+G_A+P_L+G_B-T_B+G_B+P_L+G_A-T_A$

At 306, transceiver 116 of device 104 sends $S_B$ to device 102 at transmission power $P_B$. The received power level of $S_B$ ($RPS_B$) at device 102 is calculated by including the gain $G_B$ 114 of the antenna of device 104, the transmission loss $P_L$ on the channel 101, the gain $G_A$ 108 of the antenna of device 102, and the thermal power loss $T_A$ of device 102.

$RPS_B$ at device 102 depends on $P_B+G_B+P_L+G_A-T_A$

At 308, transceiver 106 of device 102 loops back SB to device 104 as signal S'B at transmission power level A. The received power level of S'B, $RPS'_B$, at transceiver 116 of device 104 is calculated by including the gain GA 108 of the antenna of device 102, the transmission loss $P_L$ on the channel 101 from device 102 to device 104, and the thermal power loss TB of device 104 to the original signal SB as was received at transceiver 106 and that was looped back.

$RPS'_B$ at device 104 depends on $P_A+P_B+G_B+P_L+G_A-T_A+G_B+P_L+G_A-T_B$

The channels for the signal transmission and signal loop back from A to B and from B to A have essentially equivalent error statistics. Based on the power calculations, the received power level of $S'_A$ ($RPS'_A$) at transceiver 106 of device 102 and the received power level of $S'_B$ ($RPS'_B$) at transceiver 116 of device 104 are determined by the same factors. The received power level of $S'_A$ ($RPS'_A$) at transceiver 106 of device 102 and the received power level of $S'_B$ ($RPS'_B$) at transceiver 116 of device 104 are therefore determined by the same effects on $S_A$ and $S'_A$, and on $S_B$ and $S'_B$, respectively, as the signals traverse the loop between device 102 and device 104. If the signals $S_A$ and $S_B$ are sent with identical timing and coding in a signal of statistically relevant length, error information generated at device 102 and 104 from S'A and S'B, respectively, will be identical, or identical enough, and may be used to create matching keys. The sequences of FIG. 3 illustrate how $S_A$ and $S_B$ may be exchanged between device 102 and 104 to create power characteristics of signals $S'_A$ and $S'_B$ that may be utilized to create encryption/decryption keys according to the example of FIG. 2.

At 310, device 102 generates key A from $S'_A$ and encrypts/decrypts communications with device 104. Similarly, device 104 generates key B from $S'_B$ and encrypts/decrypts communications with device 102. The process of FIG. 3 may be repeated as necessary to generate an acceptable key if it is determined in either device 102 or 104 that the generated keys do not function properly to encrypt/decrypt communications.

FIGS. 4A and 4B are flow diagrams illustrating example key creation operations in communicating devices. FIG. 4A shows operations that may be performed by device 102 at operations 210 and 214 of FIG. 2. FIG. 4B shows operations that may be performed by device 104 at operations 212 and 216 of FIG. 2. FIGS. 4A and 4B may be explained with device 102 as the first device and device 104 as the second device.

Referring to FIG. 4A, the key generation process begins at 402 where device 102 receives the looped back signal $S'_A$ from device 104. Next, transceiver 106 provides $S'_A$ to loop back signal processor as signal 109. At 404, looped back signal processor 110 performs error correction coding on signal $S'_A$ and generates the error information as a number of errors $E_A$ indicated by the error correction coding. Looped back signal processor 110 may provide the number of errors $E_A$ to key generator 112 as signal 115.

At 406, key generator 112 rounds the number of errors in $E_A$ up or down to a selected value. The round off function up or down depends on the approximate number of error counts, which in turn is a function of the RF powers and distance between A and B. For large number of errors, it is most practical to round off to the closest 100th point. For instance, an error count of 1002039 is mapped down to 1002000. At 408, the rounded value of $E_A$ may then be used as an index value to retrieve a key A from a cache in device 102, where the cache includes a plurality of keys each indexed by one of a plurality of index values. Next, at 410, device 102 uses key A to encrypt/decrypt communications with device 402.

FIG. 4B illustrates how an identical, or nearly identical, key may be generated in device 104. The key generation in device 104 begins at 412 where device 104 receives the looped back signal $S'_B$ from device 102. Next, transceiver 116 provides $S'_B$ to loop back signal processor 122 as signal 111. At 414, looped back signal processor 122 performs error correction coding on signal $S'_B$ and generates the error information as a number of errors $E_B$ indicated by the error correction coding. Looped back signal processor 122 may provide the number of errors $E_B$ to key generator 124 as signal 117.

At 416, key generator 124 rounds the number of errors in $E_B$ up or down to a selected value. The round off may be done in the same manner as done by loop back signal processor 110 of device 102. At 418, the rounded value of $E_B$ may be then be used as an index value to retrieve a key B from a cache in device 104, where the cache includes a plurality of keys each indexed by one of a plurality of index values. Next, at 420, device 104 uses key B to encrypt/decrypt communications with device 402.

In another example implementation, operations 408 and 418 may be performed using the values of $E_A$ and $E_B$ to initialize a key generator circuit such as a shift register in each of device 102 and 104, respectively, instead of accessing a cache to retrieve a key. For example, this may be done by using sets of bits, combinations of the sets of bits, or the y most significant bits of the bits representing the values of $E_A$ and $E_B$ in each device, as seed values for initializing a linear feedback shift register (LFBSR), in each device. The LFSBRs may then be cycled in each of the first and second devices in an identical manner to generate an output sequence to use as encryption/decryption keys. In further implementations, operations 408 and 418 may be implemented as any other type of process, operation, transformation or function that acts to create an encryption key based on the bits comprising the values of $E_A$ and $E_B$.

Figure 5:
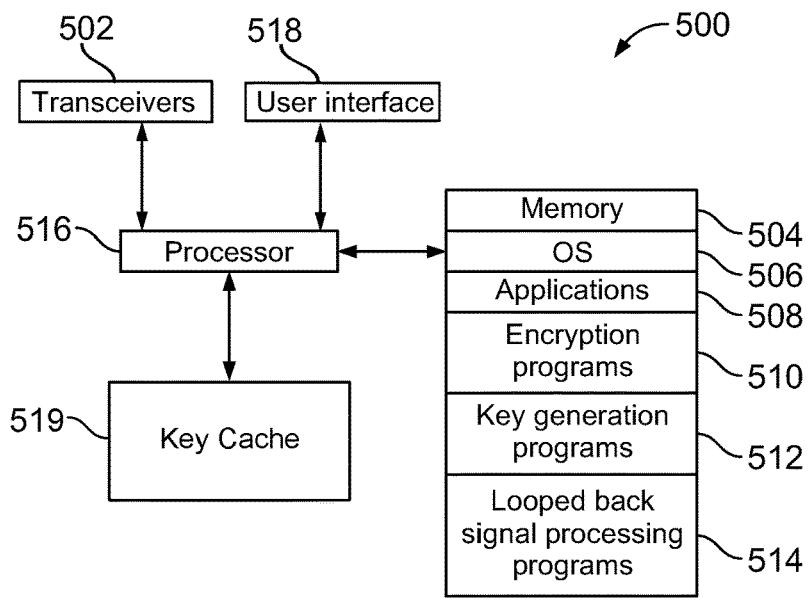
FIG. 5 illustrates an example device implemented as a mobile device.

Referring now to FIG. 5, therein is a simplified block diagram of an example device 500. The functions of device 102 of FIG. 1B may be implemented on a device such as device 500. In an example implementation, device 500 may be a mobile device. Device 500 may include a processor 516, memory 504, user interface 518, key cache 519, and transceivers 502. Memory 504 may be implemented as any type of computer readable storage media, including non-volatile and volatile memory. Memory 504 is shown as including code comprising device operating system (OS) 506, applications 508, encryption/decryption programs 510, key generation program 512, and looped back signal processing programs 514. Processor 516 may comprise one or more processors, or other control circuitry, or any combination of processors and control circuitry. The encryption/decryption programs 510, key generation program 512, and looped back signal processing programs 514 may provide the functions shown in device 102 in FIG. 1B. When executed, the encryption/decryption control programs 510, key generation program 512, and looped back signal processing programs 514 may cause processor 516 to control device 500 to perform processes described in relation to FIGS. 2, 3, 4A, and 4B. Key cache 519 may be used in an implementation in which the encryption/decryption key is generated by retrieving a key from cache memory based on error information such as described in relation to FIG. 4A.

User interface 518 may include any type of interface such as a touchscreen, a keypad, a voice controlled interface, interfaces that are gesture or motion based, an interface that receives input wirelessly, or any other type of interface that allows a user to provide appropriate control of device 500 for performing the operations of the embodiments. In some embodiments, a user of device 500 may be able to initiate the generation of keys for communicating with another device by selecting from a menu and initiating a handshake process for confirming the key generation with the other device.

In example implementations, device 500 may be any type of device that may be configured to communicate through transceivers 502 with a network or other device using encrypting/decrypting of data communications. For example, device 500 may be implemented in a smart phone, a tablet computer, a desktop computer, laptop computer device, gaming devices, media devices, smart televisions, multimedia cable/television boxes, smart phone accessory devices, tablet accessory devices, or personal digital assistants (PDAs). In an implementation, device 500 may operate according to a timed division half-duplexed communications standard. For example, device 500 may be implemented with transceivers 502 and OS 506 operating using half-duplex channels specified in the IEEE 802.11 Wi-Fi standards. Device 500 may also be implemented with transceivers 502 and OS 506 configured according to a cellular or wireless specification/standard such as the wide band code division multiple access (WCDMA), or long term evolution (LTE) standards specifications published by the 3rd Generation Partnership Project (3GPP). In other examples, device 500 may also be implemented with transceivers 502 and OS 506 configured according to any other wireless specifications, for example a 4G or 5G standards specification, or device 500 may be configured to operate in a proprietary system.

Figure 6:
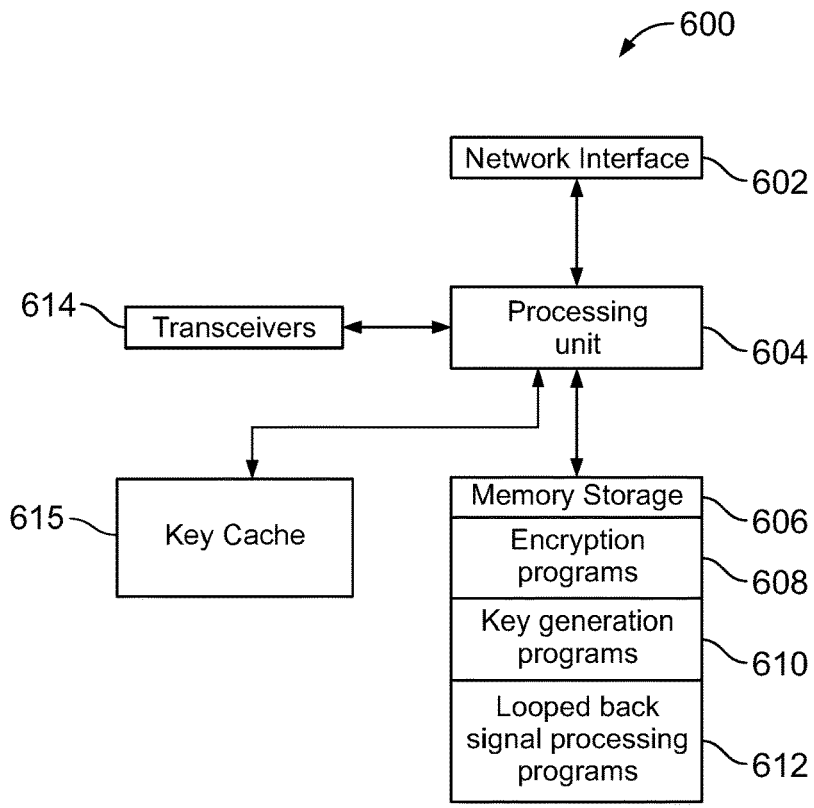
FIG. 6 illustrates an example device implemented as a network device.

Referring now to FIG. 6, therein is a simplified block diagram of another example device 600. Device 600 may be implemented, for example, as device 104 in the network 100 of FIG. 1A. In one example implementation, device 600 may be an access point such as an IEEE 802.11 Wi-Fi access point. In another example implementation, device 600 may be a base station such as a 3GPP eNodeB. Device 600 includes processing unit 704, transceivers 614, and memory/storage 606 that includes code comprising encryption programs 608, key generation programs 610, and looped back signal programs. The encryption/decryption programs 608, key generation programs 610, and looped back signal programs may provide the functions shown in device 104 in FIG. 1B. When executed, the encryption/decryption control programs 608, key generation programs 610, and looped back signal programs may cause processor 604 to control device 600 to perform processes described in relation to FIGS. 2, 3, 4A, and 4B. Key cache 615 may be used in an implementation in which the encryption/decryption key is generated by retrieving a key from cache memory based on error information such as described in relation to FIG. 4B.

Memory 606 may be implemented as any type of computer readable storage media, including non-volatile and volatile memory. Access point 600 connects to a network, such as the internet or network infrastructure, over network interface 602. Processing unit 604 may comprise one or more processors, or other control circuitry or any combination of processors and control circuitry that provide overall control of the access point according to the disclosed embodiments. Transceivers 614 provide the capability for device 600 to communicate with devices, for example device 102 of FIG. 1A, over channel 101 comprising RF channels configured according to the Wi-Fi standards, or over channel 101 comprising uplink channel 118 and downlink channel 120.

The example embodiments disclosed herein may be described in the general context of processor-executable code or instructions stored on memory that may comprise one or more computer readable storage media (e.g., tangible non-transitory computer-readable storage media such as memory 504 or 606). As should be readily understood, the terms "computer-readable storage media" or "non-transitory computer-readable media" include the media for storing of data, code and program instructions, such as memory 504, 606, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Implementations have been disclosed that included a first device comprising one or more processors and memory in communication with the one or more processors, the memory comprising code that, when executed, causes the one or more processors to control the first device to send a first setup signal to a second device, receive a second setup signal from the second device, wherein the second setup signal comprises the first setup signal looped back from the second device, process the second setup signal to generate error information, generate a key using the error information, and, utilize the key to exchange at least one data signal with the second device. The code may further cause the one or more processors to control the first device to receive a third setup signal from the second device and loop back the third setup signal to the second device. The error information may comprise a number of bit errors in the second setup signal. The memory may further comprise a cache portion and the code causes the one or more processors to control the first device to generate the key by controlling the first device to generate an index value from the error information, and retrieve the key from the cache portion based on the index value. The first device may further comprise a key generator circuit, and the code may cause the one or more processors to control the first device to generate the key by controlling the first device to generate a value from the error information, initialize the key generator circuit using the value, and generate the key from the initialized key generator circuit. The error information may comprise a number of bit errors and the code may cause the one or more processors to control the first device to generate the key by controlling the first device to round off the number of bit errors to a selected granularity and generate the key using the rounded off number of bit errors. The code may cause the one or more processors to control the first device round off the number of bit errors by controlling the first device to remove a selected number of least significant bits from the number of bit errors.

The disclosed implementations further include a method in a first device comprising sending a first setup signal to a second device, receiving a second setup signal from the second device, wherein the second setup signal comprises the first setup signal looped back from the second device, processing the second setup signal to generate error information, generating a key using the error information, and utilizing the key to exchange at least one data signal with the second device. The method may further comprise receiving a third setup signal from the second device and looping back the third setup signal to the second device. The error information may comprise a number of bit errors in the second setup signal. The generating the key may comprise generating an index value from the error information and retrieving the key from the cache portion based on the index value. The generating the key may also comprise generating a value from the error information, initializing the key generator circuit using the value, and generating the key from the initialized key generator circuit. The error information may comprise a number of bit errors and the generating the key may comprise rounding off the number of bit errors to a selected granularity and generating the key using the rounded off number of bit errors. The rounding off the number of bit errors may comprise removing a selected number of least significant bits from the number of bit errors.

The disclosed implementations further include a system comprising a first device and a second device, wherein the first device sends a first signal to the second device, the second device loops back the first signal to the first device as a second signal, and the first device generates a first key based on error information determined from the second signal, wherein the second device sends a third signal to the first device, the first device loops back the third signal to the first device as a fourth signal, and the second device generates a second key based on error information determined from the fourth signal, and, wherein the first device and second device encrypt and decrypt communications between the first device and second device using the first key and second key, respectively. The error information determined from the second signal may comprise a first number of bit errors and the error information determined from the fourth signal may comprise a second number of bit errors. The first device may generate the first key based on the first number of bits errors by rounding the first number of bits errors to a selected granularity, and the second device may generate the second key based on the second number of bits errors by rounding the second number of bits errors to the selected granularity. The first device may send the first signal and the fourth signal to the second device at a first power level and the second device may send the second signal and the third signal to the first device at a second power level different from the first power level. Also, the first device may send the first signal and the fourth signal to the second device at a first power level and the second device may send the second signal and the third signal to the first device at a second power level the same as the first power level. The first device may generate the first key based on error information determined from the second signal by retrieving the first key from a first cache memory using the error information determined from the second signal, and the second device may generate the second key based on error information determined from the fourth signal by retrieving the second key from a second cache memory using the error information determined from the fourth signal.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A first device comprising:
   one or more processors; and
   memory in communication with the one or more processors, the memory comprising code configured to cause the one or more processors to control the first device to:
   send a first setup signal to a second device;
   receive, from the second device, a second setup signal comprising a loop-back signal of the first setup signal sent to the second device;
   generate, based on the received second setup signal, error information of the received second setup signal;
   generate, from the generated error information, a key indicative of the error information; and
   based on the generated key, encrypt or decrypt a data signal transmitted between the first and second devices.

2. The first device of claim 1, wherein the code is further configured to cause the one or more processors to control the first device to:
   receive a third setup signal from the second device; and
   loop back the third setup signal to the second device.

3. The first device of claim 1, wherein the error information comprises a number of bit errors in the second setup signal.

4. The first device of claim 1, further comprising a data storage configured to store a plurality of keys, wherein, to generate the key, the code is further configured to cause the one or more processors to control the first device to:
   generate an index value from the error information; and retrieve, from the data storage, one of the plurality of keys corresponding to the index value.

5. The first device of claim 1, further comprising a key generator circuit, and wherein, to generate the key, the code is further configured to cause the one or more processors to control the first device to:
generate a value from the error information;
initialize the key generator circuit using the value; and
generate the key from the initialized key generator circuit.

6. The first device of claim 1, wherein the error information comprises a number of bit errors, and to generate the key, the code is further configured to cause the one or more processors to control the first device to:
round off the number of bit errors to a selected granularity; and
generate the key using the rounded off number of bit errors.

7. The first device of claim 6, wherein, to round off the number of bit errors, the code is further configured to cause the one or more processors to control the first device to remove a selected number of least significant bits from the number of bit errors.

8. A method of operating a first device, comprising:
sending a first setup signal to a second device;
receiving, from the second device, a second setup signal comprising a loop-back signal of the first setup signal sent to the second device;
generating, based on the received second setup signal, error information of the received second setup signal;
generating, from the generated error information, a key indicative of the error information; and
based on the generated key, encrypting or decrypting a data signal transmitted between the first and second devices.

9. The method of claim 8, further comprising:
receiving a third setup signal from the second device; and
looping back the third setup signal to the second device.

10. The method of claim 8, wherein the error information comprises a number of bit errors in the second setup signal.

11. The method of claim 8, wherein the first device comprises a data storage storing a plurality of keys, and generating the key comprises:
generating an index value from the error information; and
retrieving, from the data storage, one of the plurality of keys corresponding to the index value.

12. The method of claim 8, wherein generating the key comprises:
generating a value from the error information;
initializing a key generator circuit using the value; and
generating the key from the initialized key generator circuit.

13. The method of claim 8, wherein the error information comprises a number of bit errors, and generating the key comprises:
rounding off the number of bit errors to a selected granularity; and
generating the key using the rounded off number of bit errors.

14. The method of claim 13, wherein rounding off the number of bit errors comprises removing a selected number of least significant bits from the number of bit errors.

15. A first device comprising:
means for sending a first setup signal to a second device;
means for receiving, from the second device, a second setup signal comprising a loop-back signal of the first setup signal sent to the second device;
means for generating, based on the received second setup signal, error information of the received second setup signal;
means for generating, from the generated error information, a key indicative of the error information; and
means for encrypting or decrypting, based on the generated key, a data signal transmitted between the first and second devices.

16. The first device of claim 15, wherein the error information comprises a number of bit errors in the second setup signal.

17. The first device of claim 16, wherein the means for generating the key comprises:
means for rounding off the number of bit errors to a selected granularity; and
means for generating the key based on the rounded off number of bit errors.

18. The first device of claim 17, wherein the means for rounding off comprises means for removing a selected number of least significant bits from the number of bit errors.

19. The first device of claim 15, wherein the means for generating the key comprises:
means for storing a plurality of keys;
means for generating an index value from the error information; and
means for retrieving, from the storing means, one of the plurality of keys corresponding to the index value.

20. The first device of claim 15, wherein the means for generating the key comprises:
means for generating a value from the error information;
means for initializing a key generator circuit using the value; and
means for generating the key from the initialized key generator circuit.

* * * * *